(12) United States Patent
Kato

(10) Patent No.: US 7,670,091 B2
(45) Date of Patent: Mar. 2, 2010

(54) BOLT AND THREAD ROLLING DIE AND THE MANUFACTURE OF THE BOLT

(75) Inventor: Takashi Kato, Nagoya (JP)

(73) Assignee: Meidoh Co., Ltd., Toyota (JP)

( * ) Notice: Subject to any disclaimer, the term of this patent is extended or adjusted under 35 U.S.C. 154(b) by 0 days.

(21) Appl. No.: 10/198,035

(22) Filed: Jul. 17, 2002

(65) Prior Publication Data

US 2003/0072635 A1   Apr. 17, 2003

(30) Foreign Application Priority Data

Oct. 11, 2001   (JP)   ............... 2001-349481

(51) Int. Cl.
*F16B 25/00* (2006.01)
*F16B 35/04* (2006.01)

(52) U.S. Cl. .............. 411/386; 411/417; 411/418

(58) Field of Classification Search ........... 411/386, 411/411, 417, 418, 420, 421
See application file for complete search history.

(56) References Cited

U.S. PATENT DOCUMENTS

| | | | | |
|---|---|---|---|---|
| 497,510 | A * | 5/1893 | Adler | 411/421 |
| 1,465,148 | A * | 8/1923 | Rosenberg | 411/418 |
| 2,232,337 | A * | 2/1941 | Meersteiner | 72/88 |
| 2,278,411 | A * | 4/1942 | Braendel | 411/386 |
| 3,083,609 | A * | 4/1963 | Lovisek | 411/386 |
| 3,527,136 | A * | 9/1970 | Wilson | 411/423 |
| 3,982,575 | A * | 9/1976 | Ollis et al. | 411/310 |
| 4,161,132 | A * | 7/1979 | Eklund et al. | 411/417 |
| 4,258,607 | A * | 3/1981 | McKewan | 411/417 |
| 4,259,889 | A * | 4/1981 | Capuano | 411/417 |
| 4,652,194 | A * | 3/1987 | Tajima et al. | 411/417 |
| 4,844,676 | A * | 7/1989 | Adamek | 411/386 |
| 5,071,301 | A * | 12/1991 | Engelhardt et al. | 411/389 |
| 5,094,618 | A * | 3/1992 | Sullivan | 433/173 |
| 5,110,245 | A * | 5/1992 | Hiroyuki | 411/421 |
| D358,212 | S * | 5/1995 | Sullivan | D24/156 |
| 5,759,003 | A * | 6/1998 | Greenway et al. | 411/421 |
| 6,010,289 | A * | 1/2000 | DiStasio et al. | 411/174 |
| 6,158,938 | A * | 12/2000 | Savoji | 411/386 |
| 6,158,939 | A * | 12/2000 | Grossberndt et al. | 411/411 |

* cited by examiner

*Primary Examiner*—Victor Batson
*Assistant Examiner*—David C Reese
(74) *Attorney, Agent, or Firm*—Cooper & Dunham LLP

(57) ABSTRACT

The object of the present invention is to provide a bolt that effectively prevents gouging, seizure and racing between the bolt and nut without the aid of a guide boss and is effective when combined with the case nut. The object can be attained by providing a bolt having a threaded shank portion wherein a plural number of notched faces slanting toward the end of the threaded shank portion at an angle ranging from ±15° to ±80° toward the axis of the threaded shank portion, are formed at the beginning of the thread part of the threaded shank portion.

6 Claims, 6 Drawing Sheets

BOLT AND THREAD ROLLING DIE AND THE MANUFACTURE OF THE BOLT

FIELD OF THE INVENTION

The present invention relates to a bolt wherein oblique screwing of said bolt into a nut is prevented, and further, thick coating film and spatters adhering to the thread of said nut can be removed during the screwing of said bolt into said nut.

DESCRIPTION OF THE PRIOR ART

It is known that gouging, seizure, or racing which occurs between a bolt and nut is caused by the oblique screwing of the bolt into the nut, or spatters of thick paint film and welding metal, which adhere to the inside of the thread in the hole of the nut. Presently, an improved bolt as shown in FIG. 8, is available to prevent the gouging, seizure or racing between a bolt and nut from occurring due to the oblique screwing or adhering matters.

Said bolt (201) consists of a head portion (202), and a shank portion (203) on which a thread part (203A) is formed (a threaded shank portion), and a guide boss (204) which extends from the end of said shank portion (203). A guide edge part (204A) and a thread edge part (204B) and a discharging ditch part (204C) are formed on said guide boss (204).

By employing said bolt (201) having said guide boss (204), when said bolt (201) is obliquely screwed into the nut (211), first of all said oblique screwing is acceptably corrected by said guide edge part (204A) of said guide boss (204), following which, said thread edge part (204B) is introduced into said nut (211), further correcting said oblique screwing, after which said thread edge part (204B) and said discharging ditch part (204 C) together diminish said gouging of said bolt (201) and said nut (211), and correct the slant error, after which said thread part (203A) of said bolt (201) is introduced into said nut (211) smoothly. Further, adhering matters such as spatters of thick paint film and welding metal and the like in the thread hole (212) of said nut (211) are removed by said guide edge part (204A) and thread edge part (204B) of said guide boss (201) through said discharging ditch part (204C), as a result, said thread part (203A) of said bolt (201) can be normally screwed into threaded hole (212) of said nut (211) without clogging of said adhering matters.

Nevertheless, when said bolt (201) is screwed into a case nut (205), as shown in FIG. 9, the case (208) of said case nut (205) interferes with said screwing of said bolt (201) into said nut (211) in said case (208). When the bottom (210) of said case (208) of said case nut (205) comes into contact with said bolt's guide boss (204), said bolt (201) can not be screwed into said case nut (205) properly, since the space (T) between said nut (211) and said case (208) of said case nut (205) is generally small and the length of said bolt (201) protruding from said nut (211) is negligible. Consequently, there is a problem that the use of said bolt with said guide boss is limited.

SUMMARY OF THE INVENTION

The object of the present invention therefore is to provide a bolt which effectively prevents gouging, seizure and racing between itself and the nut without a guide boss. Said object can be achieved by producing a bolt having a threaded shank portion, whose plural number of notched faces (slanting at an angle from between ±15° to ±80° toward its axis), are formed at the beginning of its thread part, the notched face at the entrance part slanting at a positive, and inner part, at a negative angle. The thread part's aforementioned notched faces have a pitch range of between 1 and 5, occurring from 2 to 8 places per pitch.

Further in the present invention, a thread rolling die used for the manufacture of said bolt is also provided. Said thread forming die, having the ability to form shaped notched faces at the beginning of said bolt's thread part, enables sections of said thread part to be cut slantwise, toward the axis of said bolt, at a desirable angle.

Preferably said forming sections' shape results in the faces slanting toward the end of said threaded shank portion at an angle in a range of between ±15° to ±80° toward the axis of said threaded shank portion.

Furthermore in the present invention, a method for the manufacture of said bolt which entails using said thread rolling die to roll a bolt from a bolt blank is also provided.

Figure 1:
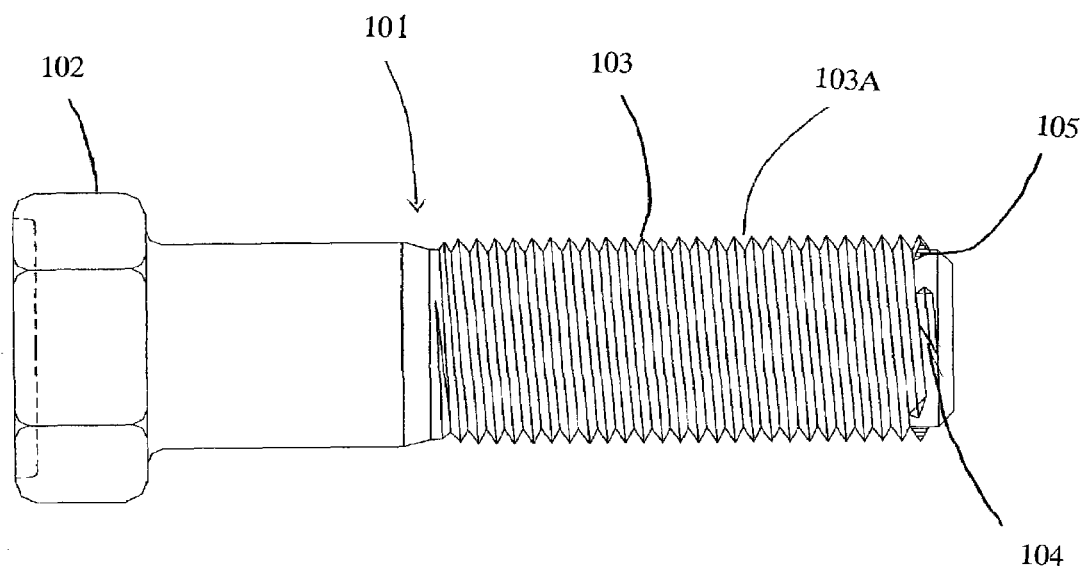
FIG. 1 is a side view of the bolt of the present invention.
Figure 2:
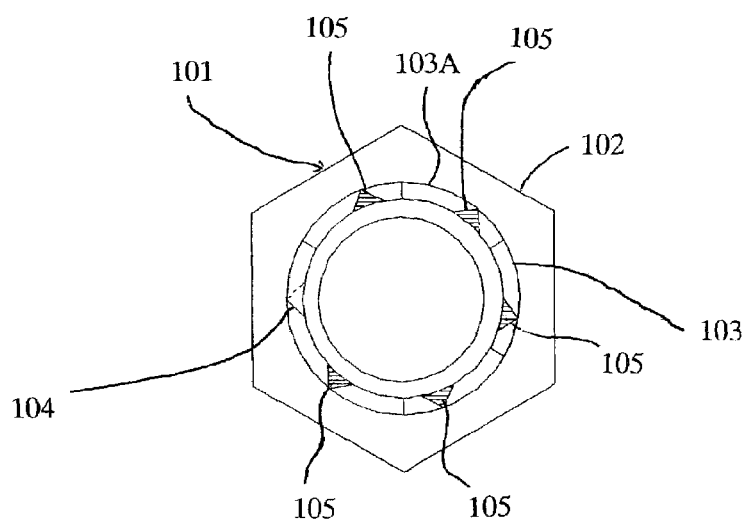
FIG. 2 is a front view of the bolt.

In the drawings,
(101) bolt of the present invention
(102) head portion
(103) shank portion (threaded shank portion)
(103A) hexagonal thread part
(104) entrance notched face
(105) inner notched faces
(106) thread rolling die
(107) thread rolling face sections
(108) thread forming section
(109) root forming section
(110, 111) notched face forming sections
AX axis
positive angle
negative angle
(201) conventional bolt
(202) head portion
(203) shank portion
(203A) thread part
(204) guide boss
(204A) guide edge part
(204B) thread edge part
(204C) discharging edge part
(205) case nut
(206) base
(207) bolt penetrable hole
(208) case
(209) hole
(210) bottom
(211) nut
(212) threaded hole
(212A) thread
G adhering matters
T space between nut and case

DETAILED DESCRIPTION AND PREFERED EMBODIMENT

Figure 3:
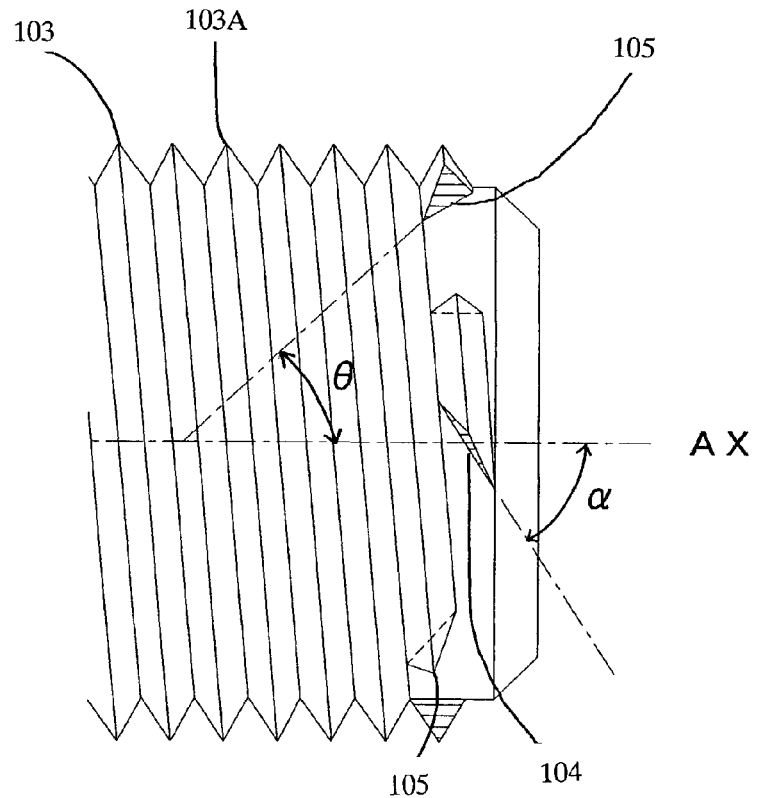
FIG. 3 is an enlarged side view of the end part of the bolt.

Referring now to FIGS. 1 to 7, a bolt (101) consists of a head portion (102) and a shank portion (103) on which a hexagonal thread part (103A) is formed (a threaded shank portion). A plural number of notched faces (104, 105) are formed at the beginning of said thread part (103A) of said shank portion (103). A notched face (104) at the entrance of said thread part (103A) of said shank portion (103) (entrance notched face) slants toward the end of said shank portion (103) at an angle (α) in a range of between ±15° and ±80°, ideally ±60°, and the other (inner) notched faces (105) slant toward the end of said shank portion (103) at an angle (θ) in a range between −15° and −80°, ideally −60°, so that said notched face at the entrance of said thread part (103A) and inner notched faces (104, 105) mutually slant conversely as shown in FIG. 3. Said notched faces (104, 105) are preferably formed at 2 to 8 places, ideally 6 places for each pitch of said threat part (103A) and said notched faces (104, 105) are preferably formed in the pitch range of between 1 and 5 of said threat part (103A).

Figure 4:
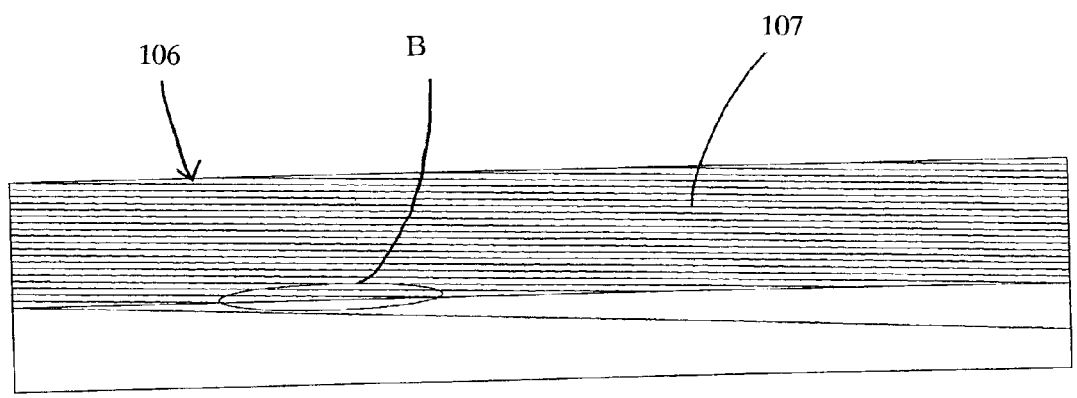
FIG. 4 is a plan view of a thread rolling die.
Figure 5:
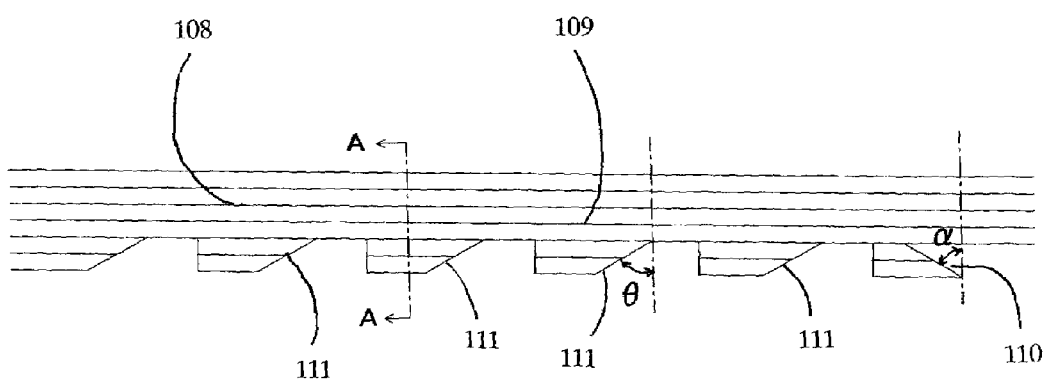
FIG. 5 is an enlarged partial plan view of part B shown in FIG. 4.
Figure 6:
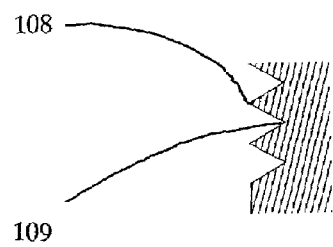
FIG. 6 is an enlarged cross-sectional view cut along line A-A in FIG. 5.

Said bolt's (101) thread is rolled using a die (106), as shown in FIGS. 4 to 6. Said thread rolling die (106) has a thread rolling face (107) in which thread forming sections (108) and root forming sections (109) are mutually formed as shown in FIG. 5, and notched face forming sections (110, 111) which are formed at the beginning of said thread forming sections (108) as shown in FIG. 5.

Each of the notched faces (104, 105) is substantially triangular, having a base extending at a constant radial distance from the axis (AX) of the shank portion.

Said notched face forming sections (110, 111) are formed by methods such as electric spark pressing, press processing, or cutting.

Figure 7:
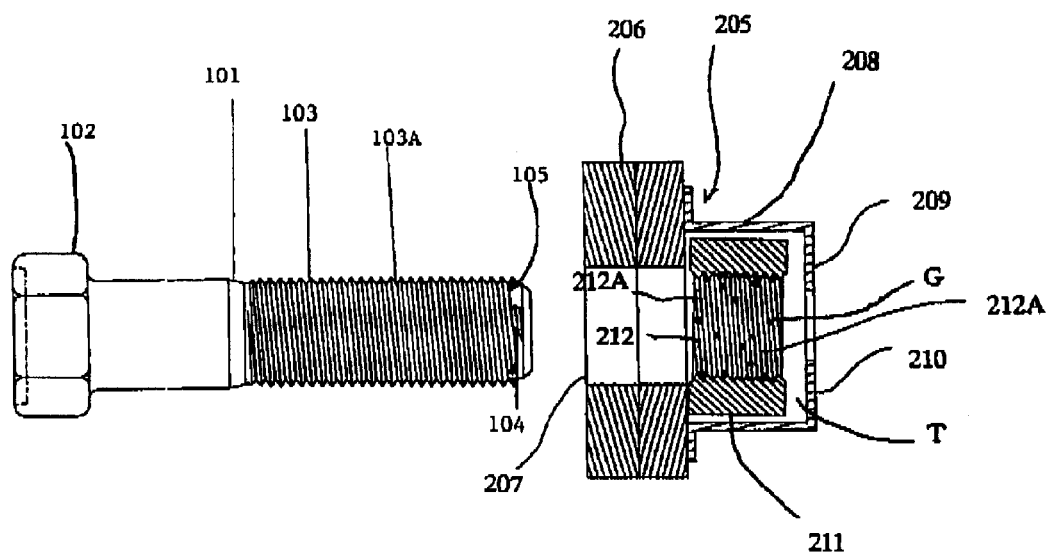
FIG. 7 is a side view of the bolt of the present invention and a case nut.
Figure 8:
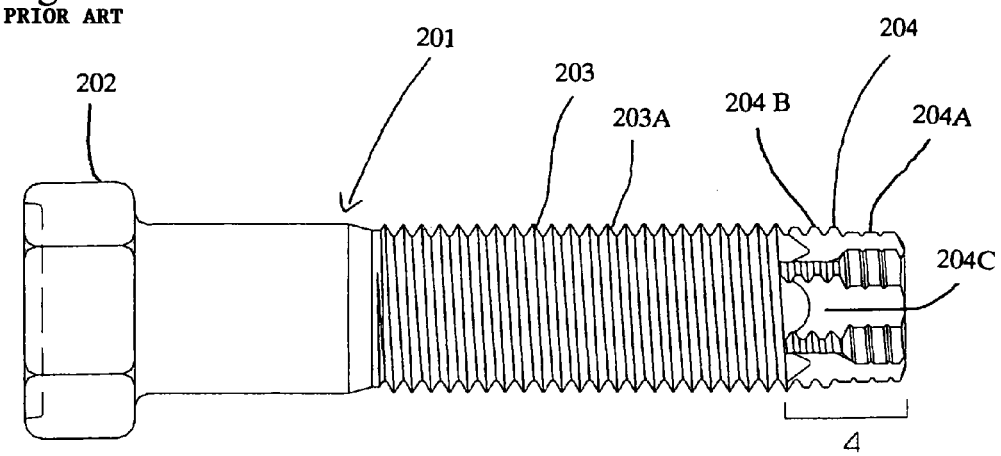
FIG. 8 is a side view of a conventional bolt having a guide boss.
Figure 9:
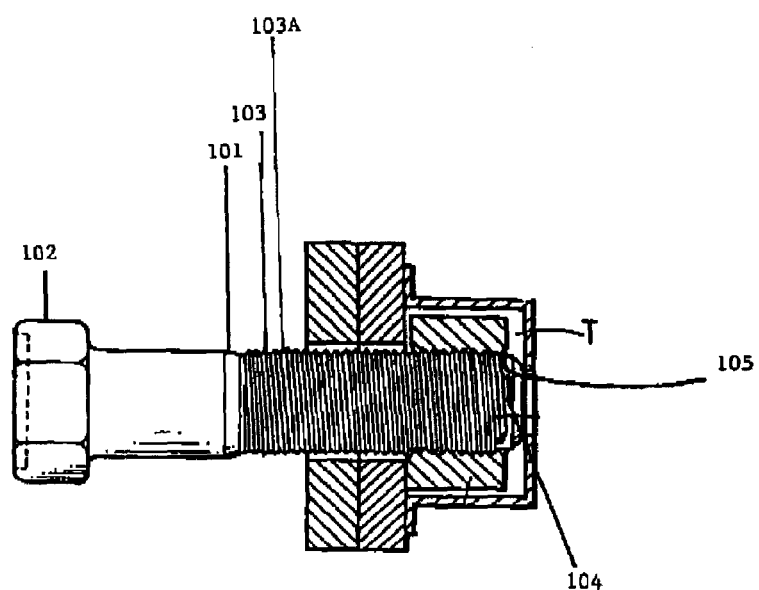
FIG. 9 is a side view after the bolt has been screwed into a case unit.

As shown in FIG. 7, a case nut (205) consists of a base (206) having a bolt penetrable hole (207), an additional case (208) attached to said base (206), having a hole (209) in its bottom (210) and containing a nut (211).

Said bolt (101) can be properly screwed in said case nut (205) without interference between said bolt (101) and said case (208) of said case nut (205), and even the space (T) between said case (208) and said nut (211) is small, since said bolt (101) has no guide boss and said notched faces (104, 105) are formed directly in said thread part (103A) of said shank portion (103) of said bolt (101).

Further, since said notched face (104) slants at a plus angle at the entrance of said thread part (103A), in a case in which said bolt (101) is obliquely screwed into said nut (211) of said case nut (205), said entrance notched face (104) corrects the oblique screwing and effectively prevents gouging from occurring between said nut (211) and bolt (101). As a result, said thread part (103A) of said bolt (101) is smoothly introduced into the thread (212A) of the threaded hole (212) of said nut (211).

Furthermore, the adhering matters (G) on said thread (212A) of said nut (211) are first raked out by said entrance notched face (104) and again by said inner notched faces (105). Since said inner notched faces (105) each slant at a minus angle, said adhering matters (G) are pushed out from said threaded hole (212) of said nut (211), effectively preventing clogging and seizure.

Said embodiment does not limit the scope of the present invention. For instance, said head portion of said bolt may be cylindrical as opposed to hexagonal, and a flange may be attached to the underside of said head portion.

Moreover, in a case in which the length of the portion of said bolt protruding from said nut is not restricted, said guide boss may be extended from the end of said bolt, or the point of said bolt may be round or flat shaped.

Further, said bolt may be screwed into female threaded holes formed in many types of parts besides said (case or cap) nut.

Furthermore, in the embodiments described above, all inner notched faces slant at a minus angle, nevertheless in some other cases, some inner notched faces may slant at a plus angle.

Still further, the thread rolling die may be of a flat or rotary type.

What is claimed is:

1. A bolt for screwing into a nut in a screwing-in revolution direction, said bolt including
    a shank portion extending along an axis and having a free end,
    said shank portion bearing a thread having a bottom, said thread having an entrance which is adjacent said free end and being made discontinuous by notching crosswisely said thread as deep as the bottom to form a plural number of substantially triangular notched faces, each of said substantially triangular notched faces being a leading edge surface of a portion of the discontinuous thread and having a base extending at a constant radial distance from said axis, said substantially triangular notched faces comprising a substantially triangular entrance notched face at the entrance of the thread and at least one substantially triangular inner notched face,
    said substantially triangular entrance notched face having a base that, as viewed in projection in a plane containing said axis, extends toward said free end at an angle α to said axis ranging between +15° and +80°, and
    each said substantially triangular inner notched face having a base that, as viewed in projection in a plane containing said axis, extends toward said free end at an angle θ to said axis ranging between −15° and −80°,
    wherein + and − respectively designate directions toward and away from the screwing-in revolution direction with respect to said axis; and
    wherein, when said bolt is screwed into a nut, said entrance notched face corrects oblique screwing.

2. A bolt having a shank portion in accordance with claim 1, wherein said notched faces are formed in the range of between 1 and 5 pitches of the thread of said shank portion formed with a thread and said notched faces are formed at 2 to 8 places for each pitch of the thread.

3. A bolt having a shank portion in accordance with claim 2, wherein said thread starts at said free end of the shank portion with said substantially triangular entrance notched face and is followed along said thread by a succession of said substantially triangular inner notched faces.

4. A bolt as in claim 1 in which said angle α is +60°.

5. A bolt as in claim 1 in which said angle θ is −60°.

6. A bolt as in claim 1 in which said notched faces are at 6 places per pitch of said thread.

* * * * *